Dec. 13, 1927.
A. F. HAHN
CASTING LINE FLOAT OR BOBBER
Original Filed June 22, 1926
1,652,858
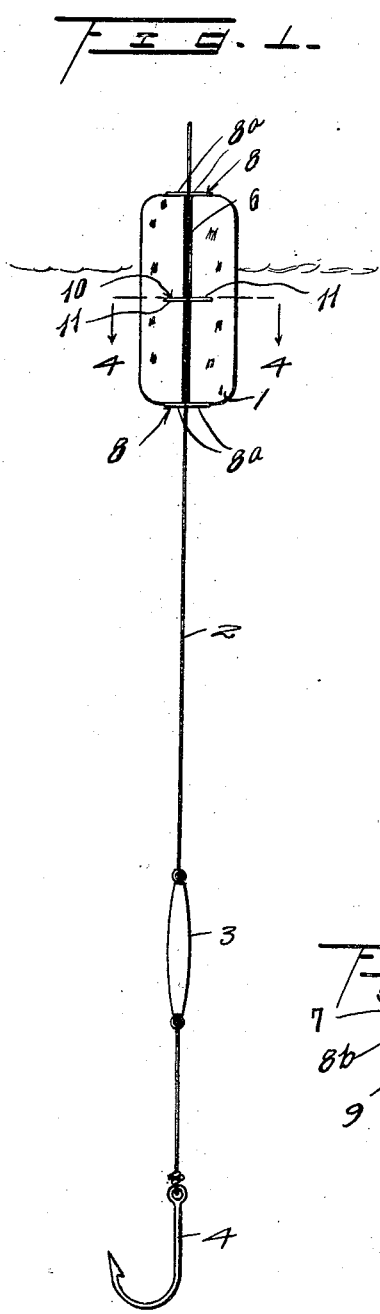
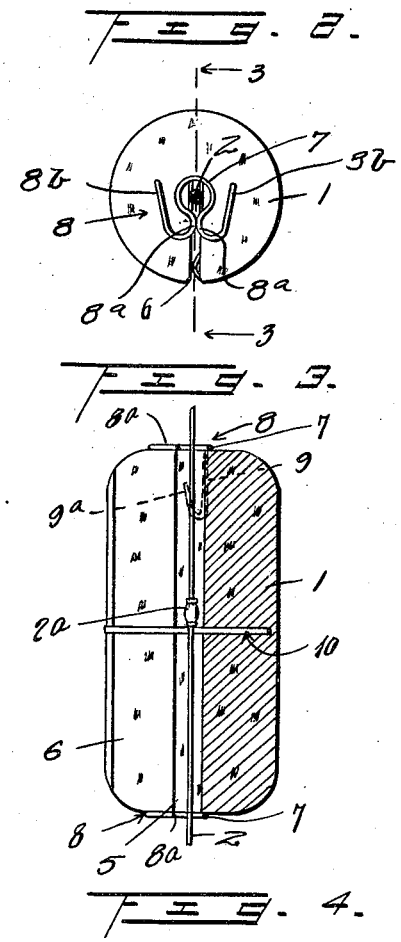
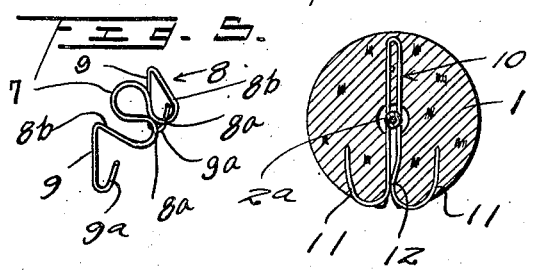
Inventor
A. F. Hahn,
By
Attorney Patented Dec. 13, 1927.

1,652,858

UNITED STATES PATENT OFFICE.

ARTHUR F. HAHN, OF ST. CLOUD, MINNESOTA.

CASTING-LINE FLOAT OR BOBBER.

Application filed June 22, 1926, Serial No. 117,728. Renewed September 14, 1927.

This invention relates to fishing line floats, and has for one of its objects the provision of a novel and simple article of this character that may be easily and quickly applied to the line and secured in the desired position thereon without the necessity of wrapping or tying any portion of the line about the same.

With the foregoing and other objects in view, the nature of which will become apparent as the description proceeds, the invention consists of the novel construction, combination and arrangement of parts hereinafter fully described and claimed, and illustrated in the accompanying drawing, wherein:

Figure 1 is an elevational view illustrating the application of the float to a fishing line, Figure 2 is a top plan view of the float, Figure 3 is a sectional view taken on a plane extending centrally and longitudinally through the float, Figure 4 is a similar view taken on a plane extending centrally and transversely through the float, and Figure 5 is a detail perspective view of one of the line retaining eyes of the float.

Corresponding and like parts are referred to in the following description, and designated in the several views of the accompanying drawing, by similar reference characters.

In the drawing, the float 1 is shown applied to a fishing line 2 equipped with a sinker 3 and hook 4.

The float 1 may be made of cork, wood or any other suitable material, and is provided with a longitudinally extending bore 5 for the reception of the line 2. A slot 6 extending longitudinally of the float 1 and communicating with the bore 5 and opening out through the lateral side of the float, permits the ready insertion of the line 2 into the bore during the application of the float to the line. The float 1 is held against the casual disconnection from the line 2 by split eyes 7 which are secured to the ends of the float in registration with the bore 5. Arms 8 having arcuate portions 8ª and straight or substantially straight portions 8ᵇ, are connected to the ends of the eyes 7 and lie in contact with the ends of the float 1. Anchoring elements 9 connected to the free terminals of the arms 8 and provided with hooked free terminals 9ª, are embedded in the float 1 for the purpose of securing the eyes 7 in place. The arcuate arm portions 8ª extend from the eyes 7 in the direction of the slot 6 and contact at points in alinement with the slot for the purpose of closing the eyes and thus prevent the accidental disconnection of the float 1 from the line 2. The straight arm portions 8ᵇ extend from the arcuate arm portions 8ª in the direction of the eyes 7 to position the anchoring elements 9 at opposite sides of the bore 5. A stop 10 which is embedded in the float 1 intermediate the ends thereof, and has a diametrical arrangement with respect to the float and extends across the bore 5, is of substantially U-form and is provided at its free terminals with arcuate anchoring elements 11 which are embedded in the float and serve to retain it in place. The stop 10 extends through the slot 6, and one of the side members thereof is offset as at 12 to close the outer end of the stop. In addition to retaining the stop 10 in place, the anchoring elements 11 also function to prevent the separation of those portions of the float 1 lying at opposite sides of the slot 6. To limit the distance that the hook 4 is to be supported below the surface of the water by the float 1, the line 2 is provided with a stop 2ª for contact with the upper side of the stop 10. The stop 2ª may be of any desired construction and made of any desired material, and is adjustable on the line 2 to permit the float 1 to support the hook 4 at the desired distance below the surface of the water.

In practice the stop 2ª is made in the line 2 at the desired point, and then the float 1 is applied to the line in a manner to position the stop 10 below the stop 2ª. The provision of the float 1 with the slot 6 permits it to be readily applied to the line 2 and during its application to the line the arcuate arm portions 8ª of the eyes 7 and the offset portion 12 of the stop 10 yield laterally and will immediately after the positioning of the line in the bore 5 return to their normal or eye and stop closing position with the result that the float cannot become accidentally detached from the line. The float 1 is now slidably mounted upon the line 2 between the stop 2ª and the sinker 3. Preparatory to making a cast with the casting rod and reel, the line 2 is drawn in until the float 1, sinker 3 and hook 4 are at the tip of the casting rod with the float resting upon the sinker. With the parts in this position, the casting may be easily accomplished, and when the float 1 strikes the water, the sinker 3 pulls the line 2 through the float until the stop 2ᵃ contacts with the upper side of the stop 10. The float 1 will now support the hook 4 at the desired distance below the surface of the water. When reeling in the line 2, the stop 2ᵃ passes through the eyes on the casting rod and winds up on the reel. This permits the line 2 to be reeled in up to the float 1, sinker 3 and hook 4, all of which parts are now close together at the tip of the casting pole.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. In combination, a fishing line float having a bore and slot extending longitudinally therethrough, the slot opening out through a side of the float and communicating with the bore, and split eyes carried by the float and provided with extended arcuate terminals yieldingly held in contact.

2. In combination, a fishing line float having a bore and slot extending longitudinally therethrough, the slot opening out through a side of the float and communicating with the bore, line retaining elements carried by the float, and a stop carried by the float and extending across the bore.

3. In combination, a fishing line float having a bore and slot extending longitudinally therethrough, the slot opening out through a side of the float and communicating with the bore, line retaining elements carried by the ends of the float, and a stop carried by the float intermediate its ends and extending across the bore.

4. In combination, a fishing line float having a bore and slot extending longitudinally therethrough, the slot opening out through a side of the float and communicating with the bore, line retaining elements carried by the float, and hook elements carried by said first named elements and embedded in the float.

5. In combination, a fishing line float having a bore and slot extending longitudinally therethrough, the slot opening out through a side of the float and communicating with the bore, line retaining split eyes carried by the float, arms having arcuate portions connected to the terminals of the eyes, and anchoring elements connected to the arms and embedded in the float.

6. In combination, a fishing line float having a bore and slot extending longitudinally therethrough, the slot opening out through a side of the float and communicating with the bore, line retaining elements carried by the float, a U-shaped stop carried by the float and extending across the bore, anchoring elements carried by the side members of the stop and embedded in the float, and one of said stop members having an offset contacting with the other of said members.

In testimony whereof I affix my signature.

ARTHUR F. HAHN.